US008430743B2

(12) United States Patent
Moshal

(10) Patent No.: US 8,430,743 B2
(45) Date of Patent: Apr. 30, 2013

(54) WAGER GAMES WITH RESTRICTED PRIZES

(75) Inventor: Martin Paul Moshal, Queens Way Quay (GI)

(73) Assignee: Cork Group Trading Ltd., Tortola (VG)

( * ) Notice: Subject to any disclaimer, the term of this patent is extended or adjusted under 35 U.S.C. 154(b) by 263 days.

(21) Appl. No.: 12/974,690

(22) Filed: Dec. 21, 2010

(65) Prior Publication Data

US 2012/0157187 A1 Jun. 21, 2012

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/25; 463/20; 463/22; 463/23; 463/40; 463/42; 273/292

(58) Field of Classification Search .................... 463/20, 463/22, 23, 25, 40, 42; 273/292

See application file for complete search history.

(56) References Cited

U.S. PATENT DOCUMENTS

| | | | | |
|---|---|---|---|---|
| 6,379,248 | B1 | 4/2002 | Jorasch et al. | |
| 6,712,697 | B2 | 3/2004 | Acres | |
| 7,063,617 | B2 | 6/2006 | Brosnan et al. | |
| 7,341,518 | B2 | 3/2008 | Muskin | |
| 2002/0151359 | A1 | 10/2002 | Rowe | |
| 2003/0064810 | A1* | 4/2003 | Okada | 463/42 |
| 2003/0155715 | A1* | 8/2003 | Walker et al. | 273/292 |
| 2003/0162588 | A1* | 8/2003 | Brosnan et al. | 463/25 |
| 2004/0032086 | A1 | 2/2004 | Barragan | |
| 2004/0254011 | A1 | 12/2004 | Muskin | |
| 2005/0170883 | A1 | 8/2005 | Muskin | |
| 2007/0060303 | A1* | 3/2007 | Govender et al. | 463/25 |
| 2009/0104979 | A1* | 4/2009 | Ruymann | 463/25 |

FOREIGN PATENT DOCUMENTS

| | | | |
|---|---|---|---|
| AU | 2003246319 | A1 | 10/2003 |
| EP | 1351180 | A2 | 10/2003 |
| EP | 1351180 | A3 | 2/2004 |
| WO | 02/41963 | | 5/2002 |
| WO | 2006/027677 | | 3/2006 |

OTHER PUBLICATIONS

European Search Report for EP Application No. EP 11 19 4636 dated Feb. 24, 2012.

Supplemental European Search Report for European Patent Application No. EP 05 78 9874, dated Oct. 8, 2008, 6 pages.

(Continued)

*Primary Examiner* — Omkar Deodhar
*Assistant Examiner* — Adetokunbo O Torimiro
(74) *Attorney, Agent, or Firm* — McDonnell Boehnen Hulbert & Berghoff LLP

(57) ABSTRACT

Wagering systems with a payout percentage that exceeds 100% of wagers are presented. The payouts of these wagering systems may include unrestricted credits and/or restricted credits. Players may cash out unrestricted credits at virtually any point, but may be limited in when and/or how they can cash out or play restricted credits. By providing payouts in the form of unrestricted credits and/or restricted credits, players may find their experience with the wagering systems to be more engaging, enjoyable, and longer-lasting. Moreover, the limitations on the use of restricted credits may allow the casino operator to maintain a reasonable profit margin despite the increased duration of play.

29 Claims, 13 Drawing Sheets

OTHER PUBLICATIONS

International Search Report and Written Opinion for International Application No. PCT/IB05/02678, dated Jan. 16, 2007.
International Preliminary Report on Patentability for International Application No. PCT/IB05/02678, dated Mar. 13, 2007.
Notice of Allowability for U.S. Appl. No. 10/550,744, dated Nov. 26, 2010.
Final Office Action for U.S. Appl. No. 10/550,744, dated Jun. 23, 2010.
Non-Final Office Action for U.S. Appl. No. 10/550,744, dated Dec. 24, 2009.
Final Office Action for U.S. Appl. No. 10/550,744, dated Sep. 28, 2009.
Non-Final Office Action for U.S. Appl. No. 10/550,744, dated Apr. 4, 2008.
Australian Patent Examination Report No. 1 for Patent Application No. 2011253848, issued Dec. 20, 2012, pp. 1-4.
Canadian Examiner's Report dated Feb. 5, 2013 for Canadian Application No. 2,760,112, pp. 1-2.

* cited by examiner 51 52 54 55

| OUTCOME DESCRIPTION | NUMBER OF ARRANGEMENTS OF ELEMENTS | PROBABILITY | RANDOM NUMBER RANGE |
|---|---|---|---|
| Non-winning Combination | 8570 | 80.48% | 1-8570 |
| Cherry / any / any | 680 | 6,386% | 8571-9250 |
| any / any / Cherry | 680 | 6.386% | 9251-9930 |
| Cherry / Cherry / any | 200 | 1,878% | 9931-10130 |
| any / Cherry / Cherry | 200 | 1,878% | 10131-10330 |
| Cherry / any / Cherry | 68 | 0.639% | 10331-10398 |
| Cherry / Cherry / Cherry | 20 | 0.188% | 10399-10418 |
| Bar / Lemon / Lemon | 42 | 0.394% | 10419-10460 |
| Lemon / Lemon / Bar | 6 | 0.056% | 10461-10466 |
| Lemon / Lemon / Lemon | 42 | 0.394% | 10467-10508 |
| Bar / Plum / Plum | 20 | 0.188% | 10508-10528 |
| Plum / Plum / Bar | 5 | 0.047% | 10529-10533 |
| Plum / Plum / Plum | 50 | 0.470% | 10534-10583 |
| Bar / Bell / Bell | 4 | 0.038% | 10584-10587 |
| Bell / Bell / Bar | 20 | 0.188% | 10588-10607 |
| Bell / Bell / Bell | 20 | 0.188% | 1 0608-10627 |
| Bar / Bar / Bar | 20 | 0.188% | 1 0628-10647 |
| 7/7/7 | 1 | 0.009% | 10648 |
|  | TOTAL | 100% |  |

53

FIG. 5

61 62 63 64

| OUTCOME DESCRIPTION | PAYOUT | PROBABILITY | EXPECTED PAYOUT |
|---|---|---|---|
| Non-winning Combination | 0 | 80.48% | 0 |
| Cherry / any / any | 2 | 6.386% | 0.128 |
| any / any / Cherry | 2 | 6.386% | 0.128 |
| Cherry / Cherry / any | 5 | 1.878% | 0.094 |
| any / Cherry / Cherry | 5 | 1.878% | 0.094 |
| Cherry / any / Cherry | 5 | 0.639% | 0.032 |
| Cherry / Cherry / Cherry | 20 | 0.188% | 0.038 |
| Bar / Lemon / Lemon | 14 | 0.394% | 0.055 |
| Lemon / Lemon / Bar | 14 | 0.056% | 0.008 |
| Lemon / Lemon / Lemon | 20 | 0.394% | 0.079 |
| Bar / Plum / Plum | 10 | 0.188% | 0.019 |
| Plum / Plum / Bar | 10 | 0.047% | 0.005 |
| Plum / Plum / Plum | 20 | 0.470% | 0.094 |
| Bar / Bell / Bell | 18 | 0.038% | 0.007 |
| Bell / Bell / Bar | 18 | 0.188% | 0.034 |
| Bell / Bell / Bell | 20 | 0.188% | 0.038 |
| Bar / Bar / Bar | 50 | 0.188% | 0.094 |
| 7/7/7 | 100 | 0.009% | 0.009 |
| | TOTAL | 100% | 0.954 |

65

FIG. 6

| Turn No. | Pre-Wager Credit Balance | Wager | Post-Wager Credit Balance | Payout | Updated Credit Balance |
|---|---|---|---|---|---|
| 1 | 100.00 | 3.00 | 97.00 | 2.86 | 99.86 |
| 2 | 99.86 | 3.00 | 96.86 | 2.86 | 99.72 |
| 3 | 99.72 | 3.00 | 96.72 | 2.86 | 99.58 |
| 4 | 99.58 | 3.00 | 96.58 | 2.86 | 99.44 |
| 5 | 99.44 | 3.00 | 96.44 | 2.86 | 99.30 |
| 6 | 99.30 | 3.00 | 96.30 | 2.86 | 99.16 |
| 7 | 99.16 | 3.00 | 96.16 | 2.86 | 99.02 |
| 8 | 99.02 | 3.00 | 96.02 | 2.86 | 98.88 |
| 9 | 98.88 | 3.00 | 95.88 | 2.86 | 98.74 |
| 10 | 98.74 | 3.00 | 95.74 | 2.86 | 98.60 |
| 11 | 98.60 | 3.00 | 95.60 | 2.86 | 98.46 |
| 12 | 98.46 | 3.00 | 95.46 | 2.86 | 98.32 |
| 13 | 98.32 | 3.00 | 95.32 | 2.86 | 98.18 |
| 14 | 98.18 | 3.00 | 95.18 | 2.86 | 98.04 |
| 15 | 98.04 | 3.00 | 95.04 | 2.86 | 97.90 |
| 16 | 97.90 | 3.00 | 94.90 | 2.86 | 97.76 |
| 17 | 97.76 | 3.00 | 94.76 | 2.86 | 97.62 |
| 18 | 97.62 | 3.00 | 94.62 | 2.86 | 97.48 |
| 19 | 97.48 | 3.00 | 94.48 | 2.86 | 97.34 |
| 20 | 97.34 | 3.00 | 94.34 | 2.86 | 97.20 |
| ... | ... | ... | ... | ... | ... |
| 679 | 5.08 | 3.00 | 2.08 | 2.86 | 4.94 |
| 680 | 4.94 | 3.00 | 1.94 | 2.86 | 4.80 |
| 681 | 4.80 | 3.00 | 1.80 | 2.86 | 4.66 |
| 682 | 4.66 | 3.00 | 1.66 | 2.86 | 4.52 |
| 683 | 4.52 | 3.00 | 1.52 | 2.86 | 4.38 |
| 684 | 4.38 | 3.00 | 1.38 | 2.86 | 4.24 |
| 685 | 4.24 | 3.00 | 1.24 | 2.86 | 4.10 |
| 686 | 4.10 | 3.00 | 1.10 | 2.86 | 3.96 |
| 687 | 3.96 | 3.00 | 0.96 | 2.86 | 3.82 |
| 688 | 3.82 | 3.00 | 0.82 | 2.86 | 3.68 |
| 689 | 3.68 | 3.00 | 0.68 | 2.86 | 3.54 |
| 690 | 3.54 | 3.00 | 0.54 | 2.86 | 3.40 |
| 691 | 3.40 | 3.00 | 0.40 | 2.86 | 3.26 |
| 692 | 3.26 | 3.00 | 0.26 | 2.86 | 3.12 |
| 693 | 3.12 | 3.00 | 0.12 | 2.86 | 2.98 |

FIG. 7

82

| OUTCOME DESCRIPTION | PAYOUT | PROBABILITY | EXPECTED PAYOUT |
|---|---|---|---|
| Non-winning Combination | 0 | 80.48% | 0 |
| Cherry / any / any | 3 | 6.386% | 0.192 |
| any / any / Cherry | 3 | 6.386% | 0.192 |
| Cherry / Cherry / any | 6 | 1.878% | 0.113 |
| any / Cherry / Cherry | 6 | 1.878% | 0.113 |
| Cherry / any / Cherry | 6 | 0.639% | 0.038 |
| Cherry / Cherry / Cherry | 13 | 0.188% | 0.024 |
| Bar / Lemon / Lemon | 15 | 0.394% | 0.059 |
| Lemon / Lemon / Bar | 30 | 0.056% | 0.017 |
| Lemon / Lemon / Lemon | 13 | 0.394% | 0.051 |
| Bar / Plum / Plum | 12 | 0.188% | 0.023 |
| Plum / Plum / Bar | 10 | 0.047% | 0.005 |
| Plum / Plum / Plum | 20 | 0.470% | 0.094 |
| Bar / Bell / Bell | 25 | 0.038% | 0.010 |
| Bell / Bell / Bar | 18 | 0.188% | 0.034 |
| Bell / Bell / Bell | 18 | 0.188% | 0.034 |
| Bar / Bar / Bar | 50 | 0.188% | 0.094 |
| 7/7/7 | 100 | 0.009% | 0.009 |
| | TOTAL | 100% | 1.10 |

85

FIG. 8

92 94

| OUTCOME DESCRIPTION | PAYOUT Cashable | Restricted | PROBABILITY | EXPECTED PAYOUT |
|---|---|---|---|---|
| Non-winning Combination | 0 | 0 | 80.48% | 0 |
| Cherry / any / any | 2.55 | 0.45 | 6.386% | 0.192 |
| any / any / Cherry | 2.55 | 0.45 | 6.386% | 0.192 |
| Cherry / Cherry / any | 5.10 | 0.90 | 1.878% | 0.113 |
| any / Cherry / Cherry | 5.10 | 0.90 | 1.878% | 0.113 |
| Cherry / any / Cherry | 5.10 | 0.90 | 0.639% | 0.038 |
| Cherry / Cherry / Cherry | 11.05 | 1.95 | 0.188% | 0.024 |
| Bar / Lemon / Lemon | 12.75 | 2.25 | 0.394% | 0.059 |
| Lemon / Lemon / Bar | 25.50 | 4.50 | 0.056% | 0.017 |
| Lemon / Lemon / Lemon | 11.05 | 1.95 | 0.394% | 0.051 |
| Bar / Plum / Plum | 10.20 | 1.80 | 0.188% | 0.023 |
| Plum / Plum / Bar | 8.50 | 1.50 | 0.047% | 0.005 |
| Plum / Plum / Plum | 17 | 3 | 0.470% | 0.094 |
| Bar / Bell / Bell | 21.25 | 3.75 | 0.038% | 0.010 |
| Bell / Bell / Bar | 15.30 | 2.70 | 0.188% | 0.034 |
| Bell / Bell / Bell | 15.30 | 2.70 | 0.188% | 0.034 |
| Bar / Bar / Bar | 42.50 | 7.50 | 0.188% | 0.094 |
| 7/7/7 | 85 | 15 | 0.009% | 0.009 |
| | TOTAL | | 100% | 1.10 |

95

FIG. 9

| Turn No. | Total Credit | Wager | Unrestricted Credit | Total Payout | Unrestricted Payout | Restricted Payout | Updated Total Credit | Unrestricted Credit Balance |
|---|---|---|---|---|---|---|---|---|
| 1 | 100.00 | 3.00 | 97.00 | 3.30 | 2.81 | 0.50 | 100.30 | 99.81 |
| 2 | 100.30 | 3.00 | 96.81 | 3.30 | 2.81 | 0.50 | 100.60 | 99.61 |
| 3 | 100.60 | 3.00 | 96.61 | 3.30 | 2.81 | 0.50 | 100.90 | 99.42 |
| 4 | 100.90 | 3.00 | 96.42 | 3.30 | 2.81 | 0.50 | 101.20 | 99.22 |
| 5 | 101.20 | 3.00 | 96.22 | 3.30 | 2.81 | 0.50 | 101.50 | 99.03 |
| 6 | 101.50 | 3.00 | 96.03 | 3.30 | 2.81 | 0.50 | 101.80 | 98.83 |
| 7 | 101.80 | 3.00 | 95.83 | 3.30 | 2.81 | 0.50 | 102.10 | 98.64 |
| 8 | 102.10 | 3.00 | 95.64 | 3.30 | 2.81 | 0.50 | 102.40 | 98.44 |
| 9 | 102.40 | 3.00 | 95.44 | 3.30 | 2.81 | 0.50 | 102.70 | 98.25 |
| 10 | 102.70 | 3.00 | 95.25 | 3.30 | 2.81 | 0.50 | 103.00 | 98.05 |
| 11 | 103.00 | 3.00 | 95.05 | 3.30 | 2.81 | 0.50 | 103.30 | 97.86 |
| 12 | 103.30 | 3.00 | 94.86 | 3.30 | 2.81 | 0.50 | 103.60 | 97.66 |
| 13 | 103.60 | 3.00 | 94.66 | 3.30 | 2.81 | 0.50 | 103.90 | 97.47 |
| 14 | 103.90 | 3.00 | 94.47 | 3.30 | 2.81 | 0.50 | 104.20 | 97.27 |
| 15 | 104.20 | 3.00 | 94.27 | 3.30 | 2.81 | 0.50 | 104.50 | 97.08 |
| 16 | 104.50 | 3.00 | 94.08 | 3.30 | 2.81 | 0.50 | 104.80 | 96.88 |
| 17 | 104.80 | 3.00 | 93.88 | 3.30 | 2.81 | 0.50 | 105.10 | 96.69 |
| 18 | 105.10 | 3.00 | 93.69 | 3.30 | 2.81 | 0.50 | 105.40 | 96.49 |
| 19 | 105.40 | 3.00 | 93.49 | 3.30 | 2.81 | 0.50 | 105.70 | 96.30 |
| 20 | 105.70 | 3.00 | 93.30 | 3.30 | 2.81 | 0.50 | 106.00 | 96.10 |
| ... | ... | ... | ... | ... | ... | ... | ... | ... |
| 485 | 245.20 | 3.00 | 2.62 | 3.30 | 2.81 | 0.50 | 245.50 | 5.43 |
| 486 | 245.50 | 3.00 | 2.43 | 3.30 | 2.81 | 0.50 | 245.80 | 5.23 |
| 487 | 245.80 | 3.00 | 2.23 | 3.30 | 2.81 | 0.50 | 246.10 | 5.04 |
| 488 | 246.10 | 3.00 | 2.04 | 3.30 | 2.81 | 0.50 | 246.40 | 4.84 |
| 489 | 246.40 | 3.00 | 1.84 | 3.30 | 2.81 | 0.50 | 246.70 | 4.65 |
| 490 | 246.70 | 3.00 | 1.65 | 3.30 | 2.81 | 0.50 | 247.00 | 4.45 |
| 491 | 247.00 | 3.00 | 1.45 | 3.30 | 2.81 | 0.50 | 247.30 | 4.26 |
| 492 | 247.30 | 3.00 | 1.26 | 3.30 | 2.81 | 0.50 | 247.60 | 4.06 |
| 493 | 247.60 | 3.00 | 1.06 | 3.30 | 2.81 | 0.50 | 247.90 | 3.87 |
| 494 | 247.90 | 3.00 | 0.87 | 3.30 | 2.81 | 0.50 | 248.20 | 3.67 |
| 495 | 248.20 | 3.00 | 0.67 | 3.30 | 2.81 | 0.50 | 248.50 | 3.48 |
| 496 | 248.50 | 3.00 | 0.48 | 3.30 | 2.81 | 0.50 | 248.80 | 3.28 |
| 497 | 248.80 | 3.00 | 0.28 | 3.30 | 2.81 | 0.50 | 249.10 | 3.09 |
| 498 | 249.10 | 3.00 | 0.09 | 3.30 | 2.81 | 0.50 | 249.40 | 2.89 |

FIG. 10

112

111

| OUTCOME DESCRIPTION | PAYOUT | TYPE | PROBABILITY | EXPECTED PAYOUT |
|---|---|---|---|---|
| Non-winning Combination | 0 | - | 80.48% | 0 |
| Cherry / any / any | 3 | Restricted | 6.386% | 0.192 |
| any / any / Cherry | 3 | Unrestricted | 6.386% | 0.192 |
| Cherry / Cherry / any | 6 | Unrestricted | 1.878% | 0.113 |
| any / Cherry / Cherry | 6 | Unrestricted | 1.878% | 0.113 |
| Cherry / any / Cherry | 6 | Unrestricted | 0.639% | 0.038 |
| Cherry / Cherry / Cherry | 13 | Unrestricted | 0.188% | 0.024 |
| Bar / Lemon / Lemon | 15 | Unrestricted | 0.394% | 0.059 |
| Lemon / Lemon / Bar | 30 | Unrestricted | 0.056% | 0.017 |
| Lemon / Lemon / Lemon | 13 | Unrestricted | 0.394% | 0.051 |
| Bar / Plum / Plum | 12 | Unrestricted | 0.188% | 0.023 |
| Plum / Plum / Bar | 10 | Unrestricted | 0.047% | 0.005 |
| Plum / Plum / Plum | 20 | Unrestricted | 0.470% | 0.094 |
| Bar / Bell / Bell | 25 | Unrestricted | 0.038% | 0.010 |
| Bell / Bell / Bar | 18 | Unrestricted | 0.188% | 0.034 |
| Bell / Bell / Bell | 18 | Unrestricted | 0.188% | 0.034 |
| Bar / Bar / Bar | 50 | Unrestricted | 0.188% | 0.094 |
| 7/7/7 | 100 | Unrestricted | 0.009% | 0.009 |
| | | TOTAL | 100% | 1.10 |

FIG. 11

| Turn No. | Total Credit | Wager | Unrestricted Credit | Total Payout | Unrestricted Payout | Restricted Payout | Updated Total Credit | Unrestricted Credit Balance |
|---|---|---|---|---|---|---|---|---|
| 1 | 100.00 | 3.00 | 97.00 | 3.30 | 2.81 | 0.50 | 100.30 | 99.81 |
| 2 | 100.30 | 3.00 | 96.81 | 3.30 | 2.81 | 0.50 | 100.60 | 99.61 |
| 3 | 100.60 | 3.00 | 96.61 | 3.30 | 2.81 | 0.50 | 100.90 | 99.42 |
| 4 | 100.90 | 3.00 | 96.42 | 3.30 | 2.81 | 0.50 | 101.20 | 99.22 |
| 5 | 101.20 | 3.00 | 96.22 | 3.30 | 2.81 | 0.50 | 101.50 | 99.03 |
| ... | ... | ... | ... | ... | ... | ... | ... | ... |
| 494 | 247.90 | 3.00 | 0.87 | 3.30 | 2.81 | 0.50 | 248.20 | 3.67 |
| 495 | 248.20 | 3.00 | 0.67 | 3.30 | 2.81 | 0.50 | 248.50 | 3.48 |
| 496 | 248.50 | 3.00 | 0.48 | 3.30 | 2.81 | 0.50 | 248.80 | 3.28 |
| 497 | 248.80 | 3.00 | 0.28 | 3.30 | 2.81 | 0.50 | 249.10 | 3.09 |
| 498 | 249.10 | 3.00 | 0.09 | 3.30 | 2.81 | 0.50 | 249.40 | 2.89 |

FIG. 12A

| Turn No. | Pre-Wager Credit Balance | Wager | Post-Wager Credit Balance | Payout | Updated Credit Balance |
|---|---|---|---|---|---|
| 499 | 249.40 | 3.00 | 246.40 | 2.86 | 249.26 |
| 500 | 249.26 | 3.00 | 246.26 | 2.86 | 249.12 |
| 501 | 249.12 | 3.00 | 246.12 | 2.86 | 248.98 |
| 502 | 248.98 | 3.00 | 245.98 | 2.86 | 248.84 |
| 503 | 248.84 | 3.00 | 245.84 | 2.86 | 248.70 |
| ... | ... | ... | ... | ... | ... |
| 2255 | 3.56 | 3.00 | 0.56 | 2.86 | 3.42 |
| 2256 | 3.42 | 3.00 | 0.42 | 2.86 | 3.28 |
| 2257 | 3.28 | 3.00 | 0.28 | 2.86 | 3.14 |
| 2258 | 3.14 | 3.00 | 0.14 | 2.86 | 3.00 |
| 2259 | 3.00 | 3.00 | 0.00 | 2.86 | 2.86 |

FIG. 12B

WAGER GAMES WITH RESTRICTED PRIZES

BACKGROUND

Operators of land-based casinos and casino web sites offer wager games that have payout percentages that are slightly in the favor of the casino operators (i.e. less than 100%). The more players that sign up and play at a casino, and specifically the more wagering that is conducted, the more revenue the casino operator realizes. Hence, casinos typically expend large sums on marketing and promotions competing with each other to attract and retain players, particularly new players.

SUMMARY

The methods, devices, and systems herein generally relate to wager games, and to enabling a workstation, such as a personal computer, to play wager games over a computer network such as the Internet. These wager games may provide bonuses to players in the form of restricted credits. Use of these restricted credits may allow a player a longer playing time for the player's initial stake.

There is a strong correlation between the retention rate of first-time casino players and their playing experience at the casino on their first visit. It is desirable that such first-time players either win on their first visit, or lose gradually so that they have a positive and enjoyable experience, thereby increasing the likelihood that the players will become long-term clients of the casino.

Online casinos may attract players through promotions that involve free credit (referred to herein as "promotion credit"), where the casino operator essentially adds "free money" to the player's credit account. The player may then use the credits in this account for placing wagers on wager games. However, promotional credit tends to be expensive for operators of online casinos and poker rooms, as the wagering of such credit may, in the long run, result in some net payout to players coming straight from the operator's bottom line.

Furthermore, while the use of promotion credit may attract new players to a casino website, it is likely to be insufficient to prevent a first-time player from having a negative playing experience. For example, the first time player may rapidly lose all of his or her credit, such as promotion credit and credit purchased with the player's own bankroll. Thus, it is desirable to offer wager games that provide payouts with a high perceived value to the player while still being profitable to an operator of the wager games.

Accordingly, in a first example embodiment, a server device may conduct a wager game with a player. The player may engage in the wager game via a client device, such as a personal computer connected to the Internet. The wager game may use a payout schedule that has a payout percentage above 100% of wagers made by the player. For example, the payout may have a statistical average of 110% of the wagered amount. In this case, for each unit of credit the player wagers, the player can expect a payout of 1.1 units of credit. However, for any given turn of the wager game, the player may receive more or fewer units of credit.

In order to allow the casino to maintain a reasonable profit margin over the long term, this credit may be awarded as a combination of restricted credit and unrestricted credit. The player may cash out the unrestricted credit at virtually any time, but may only be able to cash out the restricted credit when certain conditions are met.

In response to the client device completing a turn of the wager game, the server device may transmit an indication of the payout to the player. The payout may be based on the payout schedule, and may include restricted credit and/or unrestricted credit. In some embodiments, the unrestricted credit of the payout may have a statistical average of less than 100% of the wagered amount. In this way, the casino maintains a profit margin with respect to the payout of unrestricted credit, while the player is enticed to continue playing wager games until the conditions allowing cash out of the restricted credit are met, or the player's restricted credit is drained.

In a second example embodiment, a client device may use an account to play a wager game via a server device. The server device may receive, from the client device, a request to play the wager game, and the server device may determine whether a condition is met. This condition may relate to an extent that the account has been used to play the wager game. For example, the condition may be that a holder of the account is a first-time player of the wager game.

If the condition is met, the server device may engage in transactions with the client device to conduct the wager game. These transactions may be based on the wager game using a first payout schedule that has a first payout percentage above 100% of wagers made by the client device. The payouts to the client device may be based on the first payout schedule, and the payouts may comprise at least one of restricted credit and unrestricted credit.

On the other hand, if the condition is not met, the server device may also engage in transactions with the client device to conduct the wager game. However, these transactions may be based on the wager game using a second payout schedule that has a second payout percentage below 100% of wagers made by the client device. The payouts to the client device may be based on the second payout schedule, and the payouts may consist of unrestricted credit.

These and other aspects and advantages will become apparent to those of ordinary skill in the art by reading the following detailed description, with reference where appropriate to the accompanying drawings. Further, it should be understood that the foregoing overview is merely for purposes of illustration and is not intended to limit the scope of the invention as claimed.

BRIEF DESCRIPTION OF THE DRAWINGS

FIG. 5 is a schedule of a set of possible game play outcomes in a 3-reel video slot wager game, in accordance with an example embodiment.

FIG. 6 is a pay table of a wager game, in accordance with an example embodiment.

FIG. 7 shows the wagering activity of a player during a playing session a wager game, in accordance with an example embodiment.

FIG. 8 is another pay table of a wager game, in accordance with an example embodiment.

FIG. 9 is yet another pay table of a wager game, in accordance with an example embodiment.

FIG. 10 shows the wagering activity of a player during another playing session of a wager game, in accordance with an example embodiment.

FIG. 11 is still another pay table of a wager game, in accordance with an example embodiment.

FIGS. 12A and 12B show the wagering activity of a player during yet another playing session of a wager game, in accordance with an example embodiment.

DETAILED DESCRIPTION

Aspects of the embodiments herein may be suited for use in the context of playing of wager games over a computer network. As will be appreciated from the following discussion, these aspects are also suitable for use in other environments, including land or ship-based casinos, as well as other types of wagering environments.

Figure 1:
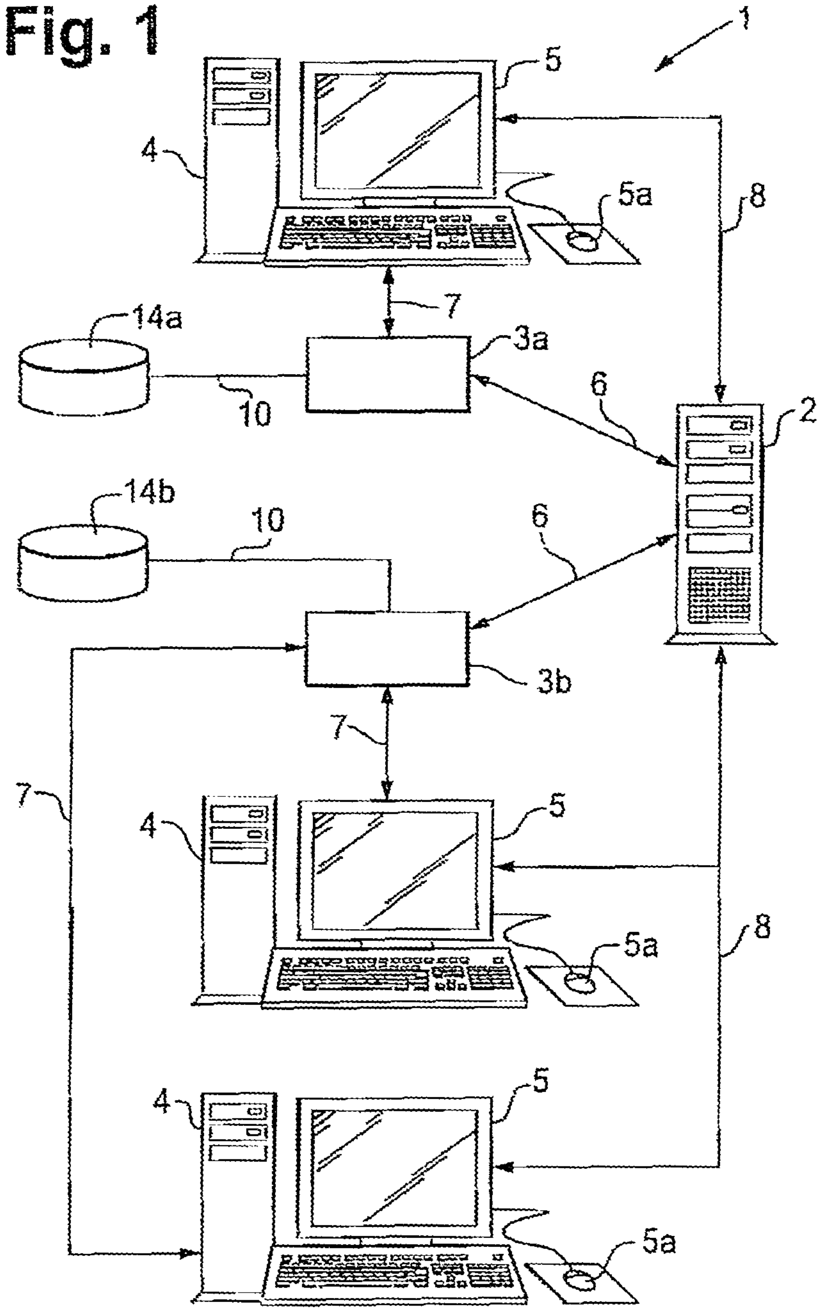
FIG. 1 is an illustration of a gaming environment in which workstations communicate with a gaming server over a computer network, in accordance with an example embodiment.

Referring to FIG. 1, a gaming system 1, suitable for use in wager games, includes a gaming server 2, and a number of portals 3*a* and 3*b*. These portals may be websites on the World Wide Web of the Internet. Each of the portal websites may be an online casino website hosted on a corresponding casino web server (not shown). For convenience, the embodiments herein will be described with particular reference to only two such portals 3*a* and 3*b*. However, other portals and/or online casino websites may be present, or, alternatively, just one portal or casino website may be present.

Each one of the online casino websites 3*a* and 3*b* may be accessible by a would-be player (not shown) through a player gaming workstation 4 in the form of an Internet-enabled computer workstation. The workstation 4 may have a display monitor 5 and an associated pointing device 5*a* such as a mouse or, alternatively, a touchpad. Online casino website 3*a* is shown as having one workstation 4 logically connected thereto, whereas online casino website 3*b* is shown as being logically connected to two workstations 4. It will be appreciated that such online casino websites 3*a* and 3*b* can be logically connected to any desired number of such workstations 4 simultaneously.

The gaming server 2, the online casino web servers (not shown) corresponding to the online casino websites 3*a* and 3*b*, and the workstations 4 are capable of communicating with each other by means of an open communication network, such as the Internet or another type of Internet Protocol (IP) network. The Internet is represented in FIG. 1 as separate logical communication networks 6, 7, 8, and 10. The particular networking topology used and presence of intermediate networks or switching equipment is not important, and may make use of intervening communications network such as the public switched telephone network, cable networks, cellular wireless networks, WiFi, WIMAX®, etc.

Each online casino operates an account facility 14*a* and 14*b*, respectively, with a credit account corresponding to each player who participates in a wager game offered by the online casino. In the illustrated embodiment, therefore, the account facility 14*a* has at least one player credit account associated with it, while account facility 14*b* has at least two associated, but separate, player accounts.

A stored workstation program (not shown) may be resident in the workstation 4. This program may enable a participating player to browse an online casino website and to interact with the gaming server 2 to play wager games such as slot machines (slots), poker, Black Jack, Roulette and other wager games. The stored workstation program may include tools for displaying, on the user interface display 5, gaming symbols (e.g., slot machine reels, cards, Roulette wheels, etc.), gaming controls by which the player can place wagers, spin the reels, etc., and the results of play. The stored workstation program may also include gaming logic for facilitating the execution of a turn of a wager game, and communications facilities for communicating player actions to the gaming server 2, and receiving messages (e.g., datagrams) from the gaming server 2 containing results of play. The data representing results of play may be translated to graphical symbols which are presented on the user interface display 5. Further details are described in U.S. patent application Ser. No. 10/550,744, filed Sep. 23, 2005, and hereby incorporated by reference in its entirety.

Each workstation 4 may take the form, for example, of a conventional personal computer operating under a WINDOWS XP®, WINDOWS VISTA®, WINDOWS® 7, or other operating system, which is well known and commercially available from Microsoft Corporation of Redmond, Wash., or other operating system such as provided by Apple Computer or a LINUX® operating system. The workstation 4 may also take the form of a portable computing device such as a tablet device, a personal digital assistant, or a cellular telephone. The workstation 4 may alternatively take the form of an electronic gaming terminal that is wholly or partially dedicated to playing casino games.

The gaming server 2 may operate under control of a server-stored program (not shown) that co-operates with the stored workstation program in order to enable a player at the computer workstation 4 to play a wager game. The gaming server 2 operates, for example, under the WINDOWS NT®, WINDOWS SERVER®, or LINUX® operating system.

The stored workstation 4 program or application (not shown) and the corresponding stored gaming server 2 program will be referred to, for convenience, as a client process and a server process, respectively. The server process may generate one or more random events that determine the outcome of turns of the wager game, such as determining the outcome of spins of the slot machine reels in the various slots games of the participating players. The client process of any particular workstation 4 may obtain the result of the random events from the gaming server 2 along the communication network 8 and may display the outcome of the wager game on the display monitor 5 of the workstation 4 in an intelligible manner. For example, the client process may cause the player's set of slots reels to spin and to come to rest at a position corresponding to the outcome.

In order to play the wager games from any particular workstation 4, the client process (not shown) may first be downloaded to that computer workstation from the gaming server 2 or, alternatively, from a separate web server (not shown), and then installed on the workstation 4.

A program that is arranged to execute on either the gaming server 2 or the workstation 4 may reside on a non-transitory computer-readable medium, such as random access memory (RAM) or read only memory (ROM), which may encompass magnetic memory, optical memory, and/or additional forms of computer memory. The computer-readable medium may have stored thereon program instructions that, if executed by a computing device (e.g., the gaming server 2 or the workstation 4), cause the computing device to perform operations consistent with any of the embodiments described herein.

A player wishing to participate in a wager game may use the workstation 4 to access an online casino website 3*a* or 3*b* of his or her choice. When the player navigates using a web browser to a home page of a casino, a promotional message may be displayed (described below). The player may be presented with an icon on the graphical user interface (GUI) of the workstation 4, which the player can activate in order to download the client process and register with the casino operator. Following these tasks, the player may request to play wager games provided on the casino website by clicking on an appropriate icon or taking other similar action.

The online casino websites 3*a* and 3*b* may be provisioned as one or more virtual slots rooms where slots is the only wager game available to would-be players, or one where a variety of different wager games are offered to the players. It will be noted again that a system implementing the methods of this invention need not include two (or more) separate online casino websites 3*a* and 3*b*, and that only one online casino website may be linked to the gaming server 2.

Figure 2:
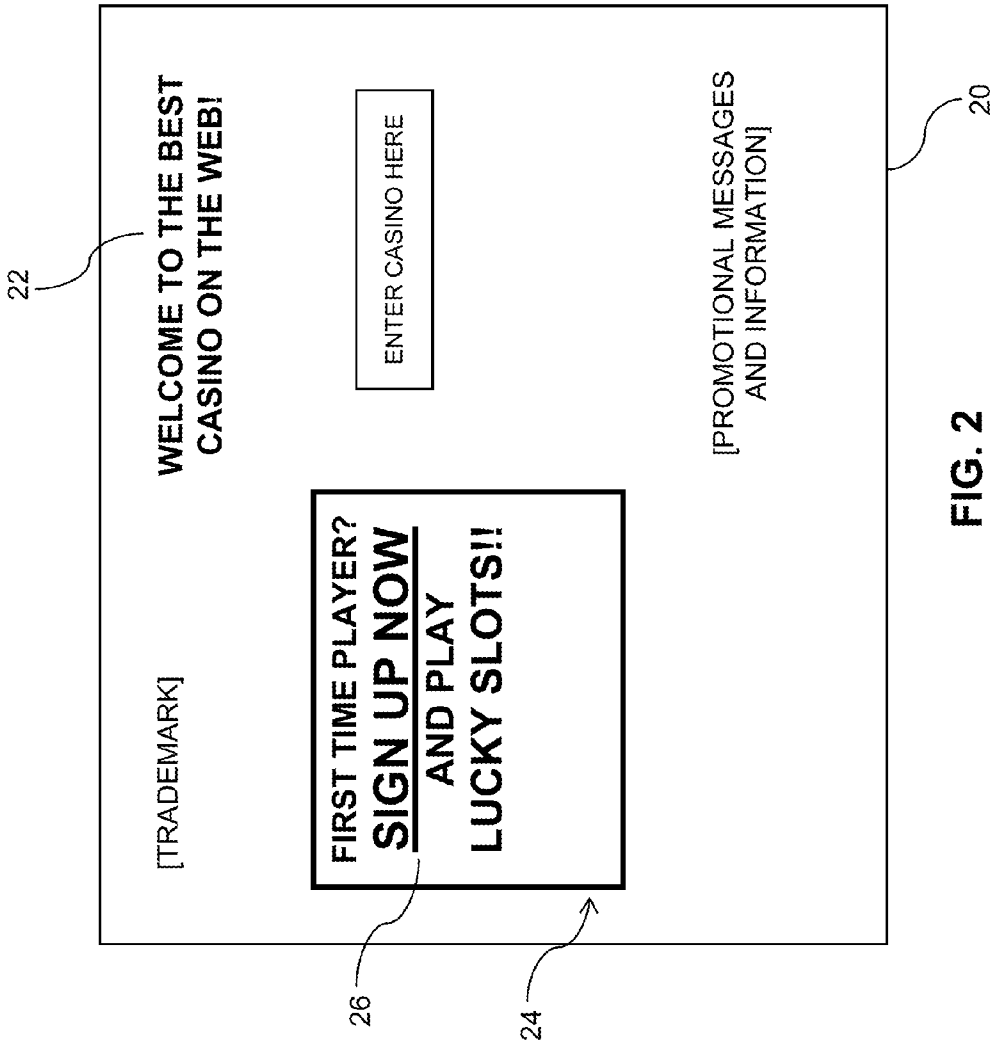
FIG. 2 is a simplified illustration of a home page of a casino website, in accordance with an example embodiment.

When a new player clicks on or navigates to one of the only casino websites 3*a* and 3*b*, they may be presented with a "home page" that contains information about the casino and its features. FIG. 2 is a simplified illustration of a home page 20 of a casino website 3*a* or 3*b*. When the workstation 4 logs on the home page 20 of the website, the workstation 4 may receive a message inviting the player to register with the casino operator and to play wager games hosted by the casino operator's website. The particular layout of the home page and the invitation can vary widely.

In the example of FIG. 2, the home page 20 includes a welcoming message and the name or trademark of the casino website 22. To proceed, the user may click on the link 26 in dialog box 24, and follow the instructions for downloading the client process and registering with the casino website operator. The user may register to play for free, or, more customarily, as a player wishing to wager for money. In the latter case, the player may place a certain amount into the player's account, such as $100.00.

After the player downloads the client process and registers with the casino, the player may select a wager game they wish to play. It is assumed in this example that the player selects to play a wager game specifically for first-time players, in this example a 3-reel video slot wager game.

Figure 3:
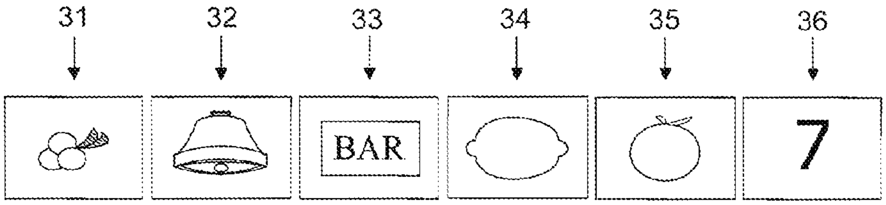
FIG. 3 is a set of reel symbols used in a 3-reel video slot wager game, in accordance with an example embodiment.

Such a 3-reel video slot wager game is illustrated in FIGS. 3-6. FIG. 3 shows a set of six different reel symbols used in the wager game, namely a cherry 31, a bell 32, a bar 33, a lemon 34, a plum 35, and a seven 36. Each reel of the video slot wager game may contain 22 reel symbols drawn from the reel symbol set of FIG. 3. Alternatively, a different number of reel symbols per set, different types of reel symbols, a different number of reel symbols per reel, and/or a different number of reels per wager game may be used.

Figure 4:
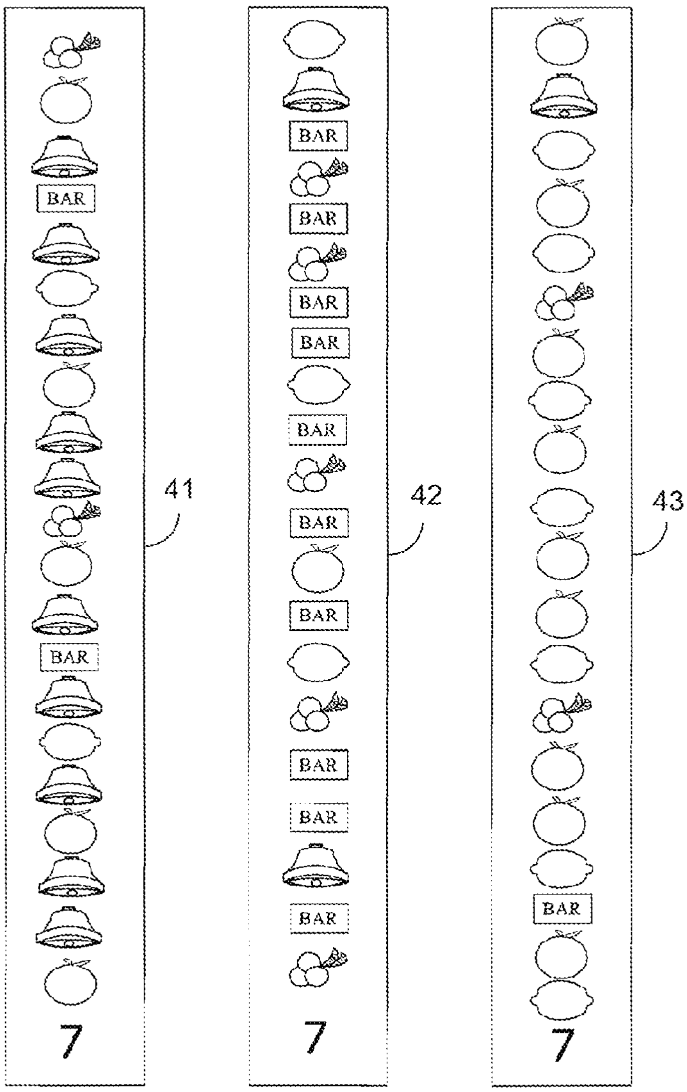
FIG. 4 is an illustration of an arrangement of the reel symbols used in a 3-reel video slot wager game, in accordance with an example embodiment.

The arrangement of the symbols on three reels 41, 42, and 43 is illustrated in FIG. 4. During play, the player may execute a turn of the video slot wager game by means of the GUI of the workstation 4. The reels 41, 42, and 43 may spin and come to rest in a randomly chosen position. For example, the rest position of the reels may be determined in the gaming server 2 and sent in the form of a datagram to the workstation 4 for display. The set of symbols showing the at-rest position of the reels constitutes an outcome of the turn. The player wins if the outcome corresponds to a winning combination in a pay table associated with the wager game. The award for a winning outcome may be determined by the pay table for the wager game.

There are 22 symbols on each of the reels 41, 42, and 43, which means that there are 10,648 (i.e., 22×22×22) possible outcomes for each turn of the wager game. The outcome probabilities are shown in the table of FIG. 5. In particular, each entry includes an outcome description 51 which describes the outcome and a number of arrangements 52 of reel symbols which yield the outcome. For example, an entry 53 corresponding to the outcome "Lemon/Lemon/Lemon" indicates that there are 42 arrangements of reel symbols that yield this outcome (i.e., 2 Lemon symbols on the reel 41×3 lemon symbols on the reel 42×7 lemon symbols on the reel 43=42 arrangements).

Each entry also includes a probability 54 of that outcome occurring in a turn of the wager game, for example, the probability of the "Lemon/Lemon/Lemon" outcome occurring is 42/10,648=0.00394 (i.e. 0.394%). Moreover, each entry in the table indicates a range of integers 55 from 1 to 10,648 that correspond to that outcome. The gaming server 2 may generate a random number in the range 1 to 10,648 in order to determine the outcome of a turn of the wager game. For example, a randomly-generated number in the range 10,467 to 10,508 may correspond to the at-rest position of the reels being the outcome "Lemon/Lemon/Lemon".

An example pay table of the three-reel slot wager game is illustrated in FIG. 6. Each entry in the pay table includes an outcome description 61 and a corresponding payout 62 awarded to the player per wagered credit, as well as a probability 63 of that outcome occurring (which may be the same as the corresponding probability in column 54 of FIG. 5) and an expected payout 64 which is the average number of wager units awarded for each turn of the wager game arising from that particular outcome. The sum 65 of all of the expected payouts 64 is 0.954 (or 95.4%) which may be referred to as the payout percentage of the wager game. Conversely, the wager game gives the casino operator a house edge of (100-95.4) %=4.6%.

FIG. 7 is a table that tracks the example wagering activity of a player during a playing session of the 3-reel video slot wager game of FIGS. 3-6. The player begins with the playing session with an initial credit balance of $100.00. As shown in FIG. 7, the player's credit balance will, on average, be totally consumed after approximately 693 turns of the wager game.

In a possible embodiment, the traditional 3-reel video slot wager game of FIGS. 3-6 may be altered to provide a nominal payout percentage of more than 100%, for example 110%. This payout may be achieved by means of a modified pay table as shown in FIG. 8. The modified pay table is similar to the pay table of FIG. 6, but the payouts 82 have been adjusted from those of FIG. 6 to yield a total expected payout 85 of 1.10 (or 110%). Thus, the modified 3-reel video slot wager game gives a player a nominal edge of (110−100)=10%.

While the modified 3-reel video slot wager game of FIG. 8 may provide a new player with an enjoyable and favorable playing experience, it will be unprofitable for the casino operator. Indeed, it could be potentially ruinous if the playing session was of a sufficiently lengthy duration. Thus, providing a wager game with such a high expected payout (i.e., any expected payout over 100%) is counter-intuitive due to its deleterious effect on the casino operator.

However, in order to make the wager game both enjoyable for the player and reasonably profitable for the casino, the modified wager game with the payout schedule of FIG. 8 may be further modified by having the payout include restricted credit and unrestricted credit. While the player may cash out unrestricted credit at virtually any time, restricted credit may only be cashed out when one or more conditions are met. Rules for cashing out restricted credit may take into account the features disclosed in U.S. patent application Ser. No. 10/550,744. For example, the casino operator may separately account for restricted credit and apply special rules thereto, such as requiring the player to achieve pre-established play-through requirements, or requiring a minimum amount of the player's own money to be wagered before permitting all or part of the restricted credit to be cashed out.

FIG. 9 depicts a pay table of a wager game featuring payouts 92 that combine restricted and unrestricted credits. The payouts 92 each include a proportion, for example 15%, consisting of restricted credits, while the remaining proportion, for example 85%, consist of unrestricted credits. Thus, the expected payouts 94 and total expected payout 95 of FIG. 9 are the same (or approximately the same) that of FIG. 8. However, the total expected payout of unrestricted credits per turn is 0.85×1.10=0.935, and the total expected payout of restricted credits is 0.15×1.10=0.165. Thus, even though the player is being awarded a payout that, on average, exceeds the amount wagered, the payout of unrestricted credits is, on average, 93.5% of the amount wagered.

In addition to dividing the payout into restricted and unrestricted credits, a player's account may be required to contain at least a predetermined proportion and/or amount of unrestricted (i.e. cashable) credit at all times. Further, the player's gaming session may terminate when this proportion and/or amount of unrestricted credit in the player's account falls below the required predetermined proportion and/or amount. In this way, the casino operator can limit the player's ability to use restricted credits for additional gameplay.

FIG. 10 is a table that tracks the composition of the account of a player during a playing session of the modified 3-reel video slot wager game of FIG. 9. The parameters of the wager game include: a payout percentage of 110%, 15% of each payout consisting of restricted credits, and the proportion of unrestricted credit in the player's account must be greater than zero at all times during the playing session. It should be noted that these parameters may take on other values without departing from the scope of the invention. For instance, the payout percentage may be 105%, 115%, 120%, or 125%, with 10%, 20%, 25%, and 30%, respectively, of each payout consisting of restricted credits.

The player commences the playing session of FIG. 10 with an initial cashable (i.e. unrestricted) credit balance of $100. After about 500 turns of the wager game, the player's total credit balance has increased from an initial sum of $100 to about $250, and consists almost entirely of restricted credits. At this stage, the player's unrestricted credit balance is exhausted (i.e., the proportion of unrestricted credit has fallen below the predetermined threshold of zero). Thus, the playing session may terminate. Alternatively or additionally, the player may purchase supplementary unrestricted credit in order to continue playing the wager game.

In this example, the casino website operator has earned $100 in revenue, while the player's credit balance has increased from an initial value of $100 to a final value of about $250, which is an increase of $150. In general, when the payout percentage of this embodiment exceeds 100% of the amount wagered, the player's credit balance upon exiting the wager game will be greater than the player's credit balance upon entering the wager game.

Furthermore, FIG. 10 also shows that the composition of the player's credit balance has changed, from an initial balance of $100 of unrestricted credit to a balance of about $250 of restricted credit. Thus, in general, this embodiment of the wager game may effectively convert an unrestricted credit balance to a restricted credit balance.

Comparing the tables in FIGS. 7 and 10, it may be apparent that, for the same initial stake of $100 of unrestricted credit, the unmodified wager game gives the player about 700 turns of the wager game on average, while the modified wager game only provides the player with 500 turns on average. A notable difference is that the player of the unmodified wager game exits the wager game with a substantially zero credit balance, while the player of the modified wager game still has a restricted credit balance of about $250 restricted credits once his or her unrestricted credits have been used.

The player may be able to consume these restricted credits on the same or other games offered by the casino operator, or may cash out these credits if one or more conditions are met. For example, once the player's unrestricted credit reaches a threshold unrestricted credit value (e.g., $0, $3, $5, $10, etc.), the player may be prohibited from continued play of the wager game. However, the player may be permitted to wager his or her remaining restricted credits on other wager games. In some embodiments, these other wager games may exhibit payout percentages less than 100%. Alternatively or additionally, the player may be permitted to continue playing the wager game, but the wager game may use a different pay table that exhibits a payout percentage less than 100% (for example, see FIGS. 11, 12A, and 12B, below). In other embodiments, the player may be allowed to cash out the restricted credit if the player has wagered more than a threshold amount of his or her own money, or has played more than a threshold number of turns of the wager game and/or other wager games of the casino operator.

Since general player expectation is for a playing session to result in a loss, the value and enjoyment that a player derives from game play is ultimately related to how long a player is able to sustain game play with a given initial bankroll. The modified wager game thus provides the player with increased "time on device" which is the length of time that the player can spend playing wager games for a given initial credit balance. A first-time player who plays the modified wager game is thus likely to have a satisfactory and exciting playing experience from a monetary perspective.

In order to facilitate this goal, or for other reasons, the casino operator can configure at least the following parameters of the modified wager game: the overall payout percentage of the wager game, the proportion of each payout that consists of restricted credit, and the minimum proportion of unrestricted credit in the players account required at all times during a playing session. These parameters can be adjusted to meet a large range of commercial objectives.

In an alternative embodiment, the pay table of the modified wager game may be arranged such that some lower-order payouts (i.e., smaller payouts) consist of restricted credit, while some higher-order payouts (i.e., larger payouts) are made with unrestricted credit. An example of such a pay table is illustrated in FIG. 11. In this pay table, in which the payout percentage of the wager game is 110%, an entry 111 corresponding to the outcome "Cherry/any/any" is associated with a payout of 3 restricted credits. All other payouts 112 consist of unrestricted credit. The proportion of wager game payouts consisting of restricted credit is the expected payout of the entry 111 divided by the total expected payout of the wager game (i.e., 0.192/1.1=0.175=17.5%).

A further alternative embodiment employs a dynamic pay table rather than a static pay table. For example, the wager game may have a two-tier pay table, the first tier comprising the pay table of FIG. 9 and the second tier comprising the pay table of FIG. 6. When a first-time player commences playing the wager game, the first tier of the dynamic pay table may be activated to provide a payout percentage exceeding 100%. Play may proceed until the proportion of unrestricted credit in the player's account drops below a threshold unrestricted credit value. At this stage, instead of exiting the wager game, the player may elect to continue to play, whereupon the second tier of the pay table may be activated and the wager game reverts to one with a payout percentage of less than 100%. In addition, when a non-first-time player enters the wager game, the second tier of the pay table is automatically activated.

A first-time player may be defined to be a player who has recently registered for game play with the gaming server 2. Alternatively, a first-time player may also be defined as a player who has played less than a particular number of turns of the wager game, or wagered less than a certain amount of unrestricted credits on the wager game. Thus, a player may be considered a first-time player despite playing the wager game over multiple gaming sessions or over a relatively long period of time. One reason for categorizing players as first-time players or non-first-time players is to grant first-time players the ability to earn restricted credits as a bonus for signing up to play the wager game, while limiting or prohibiting non-first-time players from earning restricted credits.

FIGS. 12A and 12B, in combination, are tables that track the composition of the account of a first-time player during a playing session of this further alternative embodiment. The first-time player commences the playing session with an initial cashable (i.e., unrestricted) credit balance of $100. The first tier of the two-tier pay table (i.e., the pay table of FIG. 9) is activated and the composition of the player's account is shown in FIG. 12A, which is identical to FIG. 10.

After about 500 turns on average, the player's credit balance has been converted from the initial $100 to about $250 of restricted credit. At this stage, the player may elect to continue playing the wager game, causing the second tier of the pay table (i.e., the pay table of FIG. 6) to be activated automatically. FIG. 12 shows that the player's account balance of about $250 restricted credit is depleted on average after a further 1750 turns of the wager game. It will be appreciated that the player's initial credit balance of $100 provides the player with a total of about 2250 turns of the game, on average. This is more than a threefold increase over the approximately 700 turns of the unmodified wager game that the same initial credit balance would provide, on average. Thus, the player obtains an increased time on device during the playing session.

Figure 13:
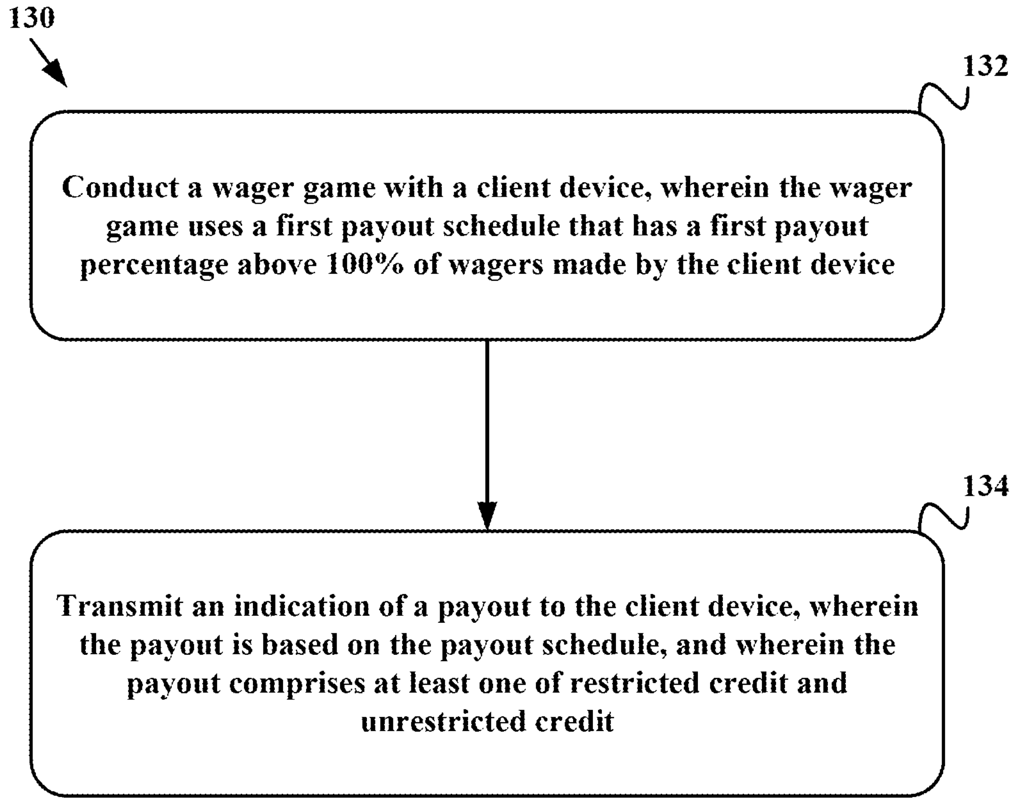
FIG. 13 is a flow chart, in accordance with an example embodiment.

FIG. 13 is a flow chart 130 of an example embodiment. At step 132, a server device may conduct a wager game with a client device. The server device may be, for example, a server hosted and/or controlled by an online casino operator (e.g., the gaming server 2), and the client device may be, for example, a personal computer, laptop computer, tablet computer, or cell phone that allows a player to access the server device and the wager game thereon (e.g., the workstation 4).

The wager game may use a payout schedule that has a payout percentage above 100% of wagers made by the client device. Thus, the payout of an individual turn of the wager game may vary. But, over time, the player can expect that the wager game will pay out more than the player wagers.

At step 134, in response to the client device completing a turn of the wager game, the server device may transmit an indication of a payout to the client device. The payout may be based on the payout schedule, and may include at least one of restricted credit and unrestricted credit (i.e., the payout may include restricted credit, unrestricted credit, or both restricted credit and unrestricted credit). For example, the payout percentage may include an unrestricted credit payout percentage below 100% of the wagers made by the client device, and a restricted credit payout percentage of a difference between the payout percentage and the unrestricted credit payout percentage. In some embodiments, the unrestricted credit may be greater than the restricted credit, and in other embodiments, the unrestricted credit may be less than or equal to the restricted credit.

The server device may permit the client device to cash out the unrestricted credit upon demand, but might permit the client device to cash out the restricted credit only when one or more conditions are met. These conditions may include, for instance, whether the client device has played a threshold number of turns of the wager game, and/or whether the client device has wagered a threshold amount of unrestricted credit. Thus, for example, the server device may determine whether a restricted credit condition has been met. If the restricted credit condition has been met, the server device may allow the client device to cash out at least some of the restricted credit. However, if the restricted credit condition has not been met, the server device may not permit the client device to cash out any of the restricted credit.

In order to facilitate the determination of these conditions, facilitate wagering and payouts, or for other purposes, the client device may be associated with an account that holds total restricted credit and total unrestricted credit available to the client device. The server device may determine that the total unrestricted credit is at or below a threshold unrestricted credit value. In response to determining that the total unrestricted credit is at or below the threshold unrestricted credit value, the server device may prohibit the client device from playing the wager game. At some point after prohibiting the client device from playing the wager game, the server device may determine that the total unrestricted credit is once again above the threshold unrestricted credit value. In response to determining that the total unrestricted credit is above the threshold unrestricted credit value, the server device may allow the client device to play the wager game. Alternatively or additionally, the server device may determine that the total unrestricted credit is at or below a threshold unrestricted credit value, and in response to the determination, the server device may transition to conducting the wager game using a second payout schedule that has a second payout percentage below 100% of wagers made by the client device.

In some embodiments, the payout schedule may associate outcomes of the wager game with respective payouts. For example, a first respective payout of the payout schedule may consist of the restricted credit, a second respective payout of the payout schedule may consist of the unrestricted credit, and a third respective payout of the payout schedule may consist of no credit. The server device may award the first respective payout, the second respective payout, and the third respective payout to the client device in different turns of the wager game. At least some of the respective payouts of the payout schedule that are below a payout threshold may consist of the restricted credit, and at least some of the respective payouts of the payout schedule that are at or above the payout threshold may consist of the unrestricted credit.

Figure 14:
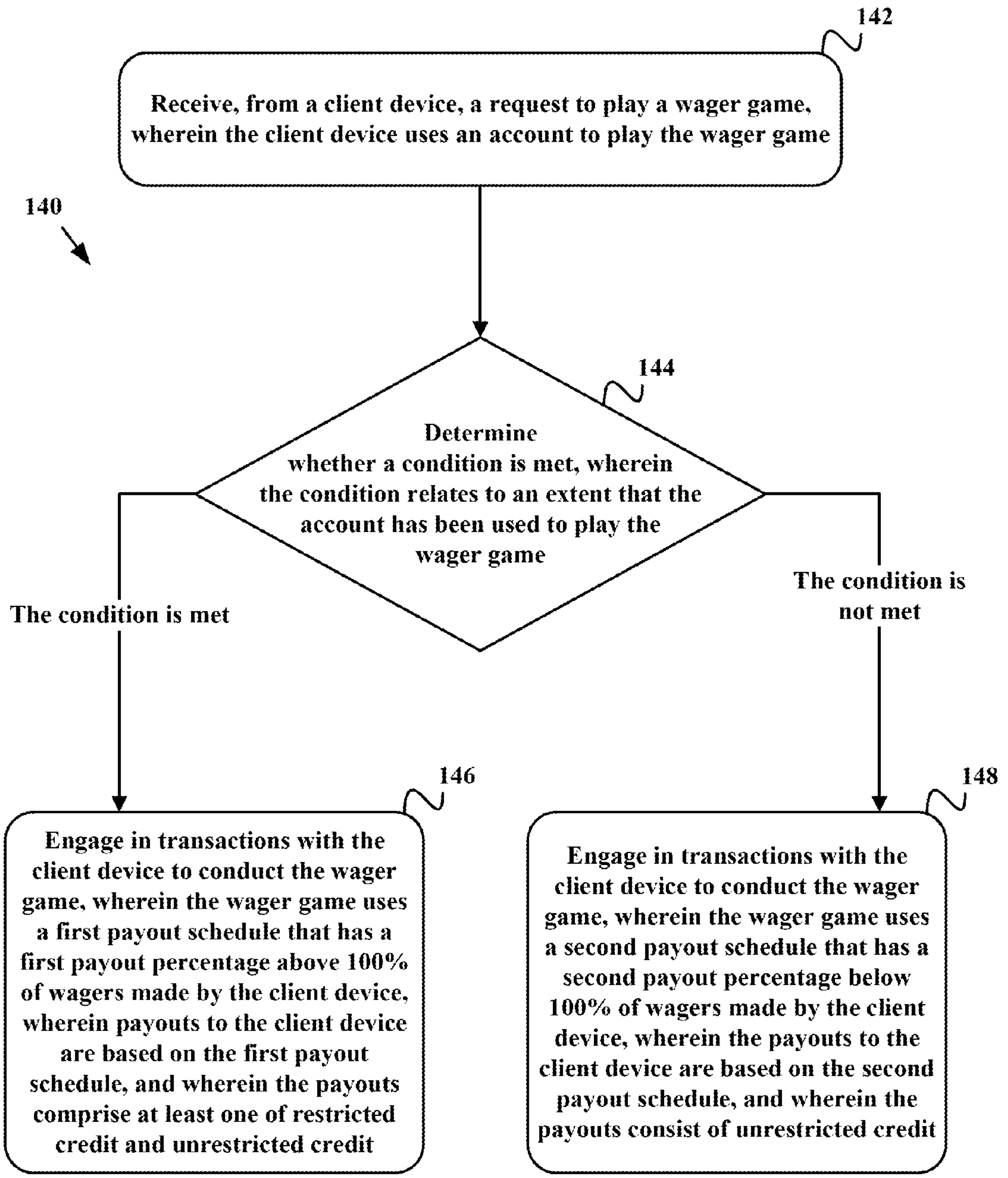
FIG. 14 is another flow chart, in accordance with an example embodiment.

FIG. 14 is a flow chart 140 of another example embodiment. At step 142, a server device may receive, from a client device, a request to play a wager game. The client device may use an account to play the wager game. At step 144, the server device may determine whether a condition is met. This condition may relate to an extent that the account has been used to play the wager game. For example, the condition may be that a holder of the account is a first-time player of the wager game.

If the condition is met, at step 146 the server device may engage in transactions with the client device to conduct the wager game. For example, these transactions may be based on the wager game using a first payout schedule that has a first payout percentage above 100% of wagers made by the client device. Payouts to the client device may be based on the first payout schedule, and the payouts may comprise at least one of restricted credit and unrestricted credit.

On the other hand, if the condition is not met, at step 148 the server device may also engage in transactions with the client device to conduct the wager game. However, these transactions may be based on the wager game using a second payout schedule that has a second payout percentage below 100% of wagers made by the client device. The payouts to the client device may be based on the second payout schedule, and the payouts may consist of unrestricted credit.

It should be understood that the flow charts of FIGS. 13 and 14 may be modified without departing from the scope of the invention. Thus, each of the flow charts 130 and 140 may contain more or fewer steps than shown, and these steps may occur in a different order, and/or may be repeated one or more times. Further, the flow charts 130 and 140 may be combined, in whole or in part.

In another example embodiment, which is illustrated by one or more of FIGS. 1-14, a data processing apparatus is configured as a server. The data processing apparatus executes instructions of a computer program so as to host a wager game in which sums are wagered on the outcomes of events by a user. If a wager is successful, there is a payout for the benefit of the user.

The data processing apparatus is in data communication with a user device, which is operated by the user, to wager the sums on the outcomes of the events. These payouts are in accordance with a payout schedule, stored by the data processing apparatus, which defines the payouts for different outcomes of events. The data processing apparatus stores an account for the user, and payouts from successful wagers, in accordance with the schedule of payouts, are credited to the user account as payout credit. The data processing apparatus is configured such that the user may use payout credit in the user's account to serve as sums to be wagered and may convert payout credit in the user's account into cash credit to be paid to the user.

The schedule of payouts stored by the data processing apparatus provides for a return to the user of credit payouts such that the total expected payout to the user exceeds 100% of the total sum wagered by the user. The data processing apparatus is also configured to store data indicating whether a payout credited to the user account is to be treated as unrestricted credit or restricted credit.

The data processing apparatus is further configured such that unrestricted credit may be converted into the cash credit to be paid to the user, and restricted credit may only be converted into the cash credit to be paid to the user if conditions defined within the data processing apparatus are met, the conditions being such that the user having wagered a threshold unrestricted credit amount or the user having played a threshold number of turns of the wager game.

The following clauses are offered as further description of the disclosed invention.

(1) A method comprising a server device conducting a wager game with a client device, wherein the wager game uses a payout schedule that has a payout percentage above 100% of wagers made by the client device; and in response to the client device completing a turn of the wager game, the server device transmitting an indication of a payout to the client device, wherein the payout is based on the payout schedule, and wherein the payout comprises at least one of restricted credit and unrestricted credit.

(2) The method of clause 1, wherein the server device permits the client device to cash out the unrestricted credit upon demand, and wherein the server device permits the client device to cash out the restricted credit only when one or more conditions are met.

(3) The method of clause 1, wherein the payout comprises the restricted credit and the unrestricted credit.

(4) The method of clause 3, wherein the unrestricted credit is greater than the restricted credit.

(5) The method of clause 1, wherein the payout schedule associates outcomes of the wager game with respective payouts, and wherein a first respective payout of the payout schedule consists of the restricted credit, a second respective payout of the payout schedule consists of the unrestricted credit, and a third respective payout of the payout schedule consists of no credit.

(6) The method of clause 5, wherein the server device awards the first respective payout, the second respective payout, and the third respective payout to the client device in different turns of the wager game.

(7) The method of clause 5, wherein at least some of the respective payouts of the payout schedule that are below a payout threshold consist of the restricted credit, and wherein at least some of the respective payouts of the payout schedule that are at or above the payout threshold consist of the unrestricted credit.

(8) The method of clause 1, wherein the client device is associated with an account that holds total restricted credit and total unrestricted credit available to the client device, the method further comprising:

the server device determining that the total unrestricted credit is at or below a threshold unrestricted credit value; and in response to the determining that the total unrestricted credit is at or below the threshold unrestricted credit value, the server device prohibiting the client device from playing the wager game.

(9) The method of clause 8, further comprising:

after prohibiting the client device from playing the wager game, the server device determining that the total unrestricted credit is above the threshold unrestricted credit value; and in response to determining that the total unrestricted credit is above the threshold unrestricted credit value, the server device allowing the client device to play the wager game.

(10) The method of clause 1, wherein the client device is associated with an account that holds total unrestricted credit available to the client device, the method further comprising:

the server device determining that the total unrestricted credit is at or below a threshold unrestricted credit value; and in response to the determination, the server device transitioning to conducting the wager game using a second payout schedule that has a second payout percentage below 100% of wagers made by the client device.

(11) The method of clause 1, wherein the payout percentage includes an unrestricted credit payout percentage below 100% of the wagers made by the client device, and a restricted credit payout percentage of a difference between the payout percentage and the unrestricted credit payout percentage.

(12) The method of clause 1, the method further comprising:

the server device determining whether a restricted credit condition has been met;

if the restricted credit condition has been met, the server device allowing the client device to cash out at least some of the restricted credit; and if the restricted credit condition has not been met, the server device not permitting the client device to cash out any of the restricted credit.

(13) The method of clause 12, wherein the restricted credit condition is the client device having wagered a threshold unrestricted credit amount.

(14) The method of clause 12, wherein the restricted credit condition is the client device having played a threshold number of turns of the wager game.

(15) An article of manufacture including a non-transitory computer-readable medium, having stored thereon program instructions that, if executed by a server device, cause the server device to perform operations comprising:

conducting a wager game with a client device, wherein the wager game uses a payout schedule that has a payout percentage above 100% of wagers made by the client device; and in response to the client device completing a turn of the wager game, transmitting an indication of a payout to the client device, wherein the payout is based on the payout schedule, and wherein the payout comprises at least one of restricted credit and unrestricted credit.

(16) The article of manufacture of clause 15, wherein the program instructions permit the client device to cash out unrestricted credit upon demand, and wherein the program instructions permit the client device to cash out the restricted credit only when one or more conditions are met.

(17) The article of manufacture of clause 15, wherein the payout comprises the restricted credit and the unrestricted credit.

(18) The article of manufacture of clause 17, wherein the unrestricted credit is greater than the restricted credit.

(19) The article of manufacture of clause 15, wherein the payout schedule associates outcomes of the wager game with respective payouts, and wherein a first respective payout of the payout schedule consists of the restricted credit, a second respective payout of the payout schedule consists of the unrestricted credit, and a third respective payout of the payout schedule consists of no credit.

(20) The article of manufacture of clause 19, wherein the program instructions are capable of awarding the first respective payout, the second respective payout, and the third respective payout to the client device in different turns of the wager game.

(21) The article of manufacture of clause 19, wherein at least some of the respective payouts of the payout schedule that are below a payout threshold consist of the restricted credit, and wherein at least some of the respective payouts of the payout schedule that are at or above the payout threshold consist of the unrestricted credit.

(22) The article of manufacture of clause 15, wherein the client device is associated with an account that holds total restricted credit and total unrestricted credit available to the client device, and wherein the program instructions, if executed by the server device, cause the server device to perform operations further comprising:

determining that the total unrestricted credit is at or below a threshold unrestricted credit value; and in response to the determining that the total unrestricted credit is at or below the threshold unrestricted credit value, prohibiting the client device from playing the wager game.

(23) The article of manufacture of clause 22, wherein the program instructions, if executed by the server device, cause the server device to perform operations further comprising:

after prohibiting the client device from playing the wager game, determining that the total unrestricted credit is above the threshold unrestricted credit value; and in response to determining that the total unrestricted credit is above the threshold unrestricted credit value, allowing the client device to play the wager game.

(24) The article of manufacture of clause 15, wherein the client device is associated with an account that holds total unrestricted credit available to the client device, and wherein the program instructions, if executed by the server device, cause the server device to perform operations further comprising:

determining that the total unrestricted credit is at or below a threshold unrestricted credit value; and in response to the determination, transitioning to conducting the wager game using a second payout schedule that has a second payout percentage below 100% of wagers made by the client device.

(25) The article of manufacture of clause 15, wherein the payout percentage includes an unrestricted credit payout percentage below 100% of the wagers made by the client device, and a restricted credit payout percentage of a difference between the payout percentage and the unrestricted credit payout percentage.

(26) The article of manufacture of clause 15, wherein the program instructions, if executed by a server device, cause the server device to perform operations further comprising:

determining whether a restricted credit condition has been met;

if the restricted credit condition has been met, allowing the client device to cash out at least some of the restricted credit; and if the restricted credit condition has not been met, not permitting the client device to cash out any of the restricted credit.

(27) The article of manufacture of clause 26, wherein the restricted credit condition is the client device having wagered a threshold unrestricted credit amount.

(28) The article of manufacture of clause 26, wherein the restricted credit condition is the client device having played a threshold number of turns of the wager game.

(29) A system comprising:

means for conducting a wager game with a client device, wherein the wager game uses a payout schedule that has a payout percentage above 100% of wagers made by the client device; and means for, in response to the client device completing a turn of the wager game, transmitting an indication of a payout to the client device, wherein the payout is based on the payout schedule, and wherein the payout comprises at least one of restricted credit and unrestricted credit.

(30) The system of clause 29 combined with any one or more of clauses 2-14.

(31) A method comprising:

a server device receiving, from a client device, a request to play a wager game, wherein the client device uses an account to play the wager game;

the server device determining whether a condition is met, wherein the condition relates to an extent that the account has been used to play the wager game;

if the condition is met, the server device engaging in transactions with the client device to conduct the wager game, wherein the wager game uses a first payout schedule that has a first payout percentage above 100% of wagers made by the client device, wherein payouts to the client device are based on the first payout schedule, and wherein the payouts comprise at least one of restricted credit and unrestricted credit; and if the condition is not met, the server device engaging in transactions with the client device to conduct the wager game, wherein the wager game uses a second payout schedule that has a second payout percentage below 100% of wagers made by the client device, wherein the payouts to the client device are based on the second payout schedule, and wherein the payouts consist of unrestricted credit.

(32) The method of clause 31, wherein the condition is that a holder of the account is a first-time player of the wager game.

(33) A data processing apparatus, configured as a server, which executes instructions of a computer program so as to host a wager game in which sums are wagered on the outcomes of events by a user and if a wager is successful there is a payout for the benefit of the user, the data processing apparatus being in data communication with a user device which is operated by the user to wager the sums on the outcomes of the events, wherein payouts are in accordance with a payout schedule stored by the data processing apparatus which defines the payouts for different outcomes of events, wherein the data processing apparatus stores an account for the user, payouts from successful wagers, in accordance with the schedule of payouts, are credited to the user account as payout credit, and the data processing apparatus is configured such that the user may use payout credit in the user's account to serve as sums to be wagered and may convert payout credit in the user's account into cash credit to be paid to the user, characterized in that:

the schedule of payouts stored by the data processing apparatus provides for a return to the user of credit payouts such that the total expected payout to the user exceeds 100% of the total sum wagered by the user;

the data processing apparatus is configured to store data indicating whether a payout credited to the user account is to be treated as unrestricted credit or a restricted credit; and the data processing apparatus is configured such that unrestricted credit may be converted into the cash credit to be paid to the user, and restricted credit may only be converted into the cash credit to be paid to the user if conditions defined within the data processing apparatus are met, the conditions being such that the user having wagered a threshold unrestricted credit amount or the user having played a threshold number of turns of the wager game.

(34) The data processing system of clause 33, combined with any one or more of clauses 2-12.

(35) Wagering systems with a payout percentage that exceeds 100% of wagers are presented. The payouts of these wagering systems may include unrestricted credits and/or restricted credits. Players may cash out unrestricted credits at virtually any point, but may be limited in when and/or how they can cash out or play restricted credits. By providing payouts in the form of unrestricted credits and/or restricted credits, players may find their experience with the wagering systems to be more engaging, enjoyable, and longer-lasting. Moreover, the limitations on the use of restricted credits may allow the casino operator to maintain a reasonable profit margin despite the increased duration of play.

While a number of example aspects and embodiments have been discussed above, those of skill in the art will recognize certain modifications, permutations, additions and sub-combinations thereof are present in the disclosure. Furthermore, other variations from the disclosed embodiments may be made without departure from the scope of the invention. All questions concerning scope are to be answered by reference to the appended claims.

What is claimed is:

1. A method comprising:

a server device conducting a wager game with a client device, wherein the wager game uses a payout schedule that has a payout percentage above 100% of wagers made by the client device, and wherein the payout percentage includes an unrestricted credit payout percentage below 100% of the wagers made by the client device, and a restricted credit payout percentage of a difference between the payout percentage and the unrestricted credit payout percentage; and in response to the client device completing a turn of the wager game, the server device transmitting an indication of a payout to the client device, wherein the payout is based on the payout schedule, and wherein the payout comprises at least one of restricted credit and unrestricted credit.

2. The method of claim 1, wherein the server device permits the client device to cash out the unrestricted credit upon demand, and wherein the server device permits the client device to cash out the restricted credit only when one or more conditions are met.

3. The method of claim 1, wherein the payout comprises the restricted credit and the unrestricted credit.

4. The method of claim 3, wherein the unrestricted credit is greater than the restricted credit.

5. The method of claim 1, wherein the payout schedule associates outcomes of the wager game with respective payouts, and wherein a first respective payout of the payout schedule consists of the restricted credit, a second respective payout of the payout schedule consists of the unrestricted credit, and a third respective payout of the payout schedule consists of no credit.

6. The method of claim 5, wherein the server device awards the first respective payout, the second respective payout, and the third respective payout to the client device in different turns of the wager game.

7. The method of claim 5, wherein at least some of the respective payouts of the payout schedule that are below a payout threshold consist of the restricted credit, and wherein at least some of the respective payouts of the payout schedule that are at or above the payout threshold consist of the unrestricted credit.

8. The method of claim 1, wherein the client device is associated with an account that holds total restricted credit and total unrestricted credit available to the client device, the method further comprising:

the server device determining that the total unrestricted credit is at or below a threshold unrestricted credit value; and in response to the determining that the total unrestricted credit is at or below the threshold unrestricted credit value, the server device prohibiting the client device from playing the wager game.

9. The method of claim 8, further comprising:

after prohibiting the client device from playing the wager game, the server device determining that the total unrestricted credit is above the threshold unrestricted credit value; and in response to determining that the total unrestricted credit is above the threshold unrestricted credit value, the server device allowing the client device to play the wager game.

10. The method of claim 1, wherein the client device is associated with an account that holds total unrestricted credit available to the client device, the method further comprising:

the server device determining that the total unrestricted credit is at or below a threshold unrestricted credit value; and in response to the determination, the server device transitioning to conducting the wager game using a second payout schedule that has a second payout percentage below 100% of wagers made by the client device.

11. The method of claim 1, the method further comprising:

the server device determining whether a restricted credit condition has been met;

if the restricted credit condition has been met, the server device allowing the client device to cash out at least some of the restricted credit; and if the restricted credit condition has not been met, the server device not permitting the client device to cash out any of the restricted credit.

12. The method of claim 11, wherein the restricted credit condition is the client device having wagered a threshold unrestricted credit amount.

13. The method of claim 11, wherein the restricted credit condition is the client device having played a threshold number of turns of the wager game.

14. An article of manufacture including a non-transitory computer-readable medium, having stored thereon program instructions that, if executed by a server device, cause the server device to perform operations comprising:

conducting a wager game with a client device, wherein the wager game uses a payout schedule that has a payout percentage above 100% of wagers made by the client device, wherein the payout percentage includes an unrestricted credit payout percentage below 100% of the wagers made by the client device, and a restricted credit payout percentage of a difference between the payout percentage and the unrestricted credit payout percentage; and in response to the client device completing a turn of the wager game, transmitting an indication of a payout to the client device, wherein the payout is based on the payout schedule, and wherein the payout comprises at least one of restricted credit and unrestricted credit.

15. The article of manufacture of claim 14, wherein the program instructions permit the client device to cash out unrestricted credit upon demand, and wherein the program instructions permit the client device to cash out the restricted credit only when one or more conditions are met.

16. The article of manufacture of claim 14, wherein the payout comprises the restricted credit and the unrestricted credit.

17. The article of manufacture of claim 16, wherein the unrestricted credit is greater than the restricted credit.

18. The article of manufacture of claim 14, wherein the payout schedule associates outcomes of the wager game with respective payouts, and wherein a first respective payout of the payout schedule consists of the restricted credit, a second respective payout of the payout schedule consists of the unrestricted credit, and a third respective payout of the payout schedule consists of no credit.

19. The article of manufacture of claim 18, wherein the program instructions are capable of awarding the first respective payout, the second respective payout, and the third respective payout to the client device in different turns of the wager game.

20. The article of manufacture of claim 18, wherein at least some of the respective payouts of the payout schedule that are below a payout threshold consist of the restricted credit, and wherein at least some of the respective payouts of the payout schedule that are at or above the payout threshold consist of the unrestricted credit.

21. The article of manufacture of claim 14, wherein the client device is associated with an account that holds total restricted credit and total unrestricted credit available to the client device, and wherein the program instructions, if executed by the server device, cause the server device to perform operations further comprising:

determining that the total unrestricted credit is at or below a threshold unrestricted credit value; and in response to the determining that the total unrestricted credit is at or below the threshold unrestricted credit value, prohibiting the client device from playing the wager game.

22. The article of manufacture of claim 21, wherein the program instructions, if executed by the server device, cause the server device to perform operations further comprising:

after prohibiting the client device from playing the wager game, determining that the total unrestricted credit is above the threshold unrestricted credit value; and in response to determining that the total unrestricted credit is above the threshold unrestricted credit value, allowing the client device to play the wager game.

23. The article of manufacture of claim 14, wherein the client device is associated with an account that holds total unrestricted credit available to the client device, and wherein the program instructions, if executed by the server device, cause the server device to perform operations further comprising:

determining that the total unrestricted credit is at or below a threshold unrestricted credit value; and in response to the determination, transitioning to conducting the wager game using a second payout schedule that has a second payout percentage below 100% of wagers made by the client device.

24. The article of manufacture of claim 14, wherein the program instructions, if executed by a server device, cause the server device to perform operations further comprising:

determining whether a restricted credit condition has been met;

if the restricted credit condition has been met, allowing the client device to cash out at least some of the restricted credit; and if the restricted credit condition has not been met, not permitting the client device to cash out any of the restricted credit.

25. The article of manufacture of claim 24, wherein the restricted credit condition is the client device having wagered a threshold unrestricted credit amount.

26. The article of manufacture of claim 24, wherein the restricted credit condition is the client device having played a threshold number of turns of the wager game.

27. A system comprising:

means for conducting a wager game with a client device, wherein the wager game uses a payout schedule that has a payout percentage above 100% of wagers made by the client device, wherein the payout percentage includes an unrestricted credit payout percentage below 100% of the wagers made by the client device, and a restricted credit payout percentage of a difference between the payout percentage and the unrestricted credit payout percentage; and means for, in response to the client device completing a turn of the wager game, transmitting an indication of a payout to the client device, wherein the payout is based on the payout schedule, and wherein the payout comprises at least one of restricted credit and unrestricted credit.

28. A method comprising:

a server device receiving, from a client device, a request to play a wager game, wherein the client device uses an account to play the wager game;

the server device determining whether a condition is met, wherein the condition relates to an extent that the account has been used to play the wager game;

if the condition is met, the server device engaging in transactions with the client device to conduct the wager game, wherein the wager game uses a first payout schedule that has a first payout percentage above 100% of wagers made by the client device, wherein the first payout percentage includes an unrestricted credit payout percentage below 100% of the wagers made by the client device, and a restricted credit payout percentage of a difference between the first payout percentage and the unrestricted credit payout percentage, wherein payouts to the client device are based on the first payout schedule, and wherein the payouts comprise at least one of restricted credit and unrestricted credit; and if the condition is not met, the server device engaging in transactions with the client device to conduct the wager game, wherein the wager game uses a second payout schedule that has a second payout percentage below 100% of wagers made by the client device, wherein the payouts to the client device are based on the second payout schedule, and wherein the payouts consist of unrestricted credit.

29. The method of claim 28, wherein the condition is that a holder of the account is a first-time player of the wager game.

* * * * *